United States Patent
Konishi et al.

(10) Patent No.: US 7,872,698 B2
(45) Date of Patent: Jan. 18, 2011

(54) LIQUID CRYSTAL DISPLAY WITH STRUCTURE RESISTANT TO EXFOLIATION DURING FABRICATION

(75) Inventors: Yukinobu Konishi, Kumamoto (JP); Akio Nakayama, Kumamoto (JP); Kazuhiro Kobayashi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 1001 days.

(21) Appl. No.: 10/082,984

(22) Filed: Feb. 25, 2002

(65) Prior Publication Data

US 2002/0130983 A1    Sep. 19, 2002

(30) Foreign Application Priority Data

Feb. 28, 2001    (JP) ............................ 2001-054854

(51) Int. Cl.
G02F 1/136    (2006.01)
(52) U.S. Cl. .................... 349/43; 349/42; 349/139; 349/138; 349/149; 349/152
(58) Field of Classification Search .......... 349/149, 349/150, 151, 152, 43, 42, 139, 147, 158, 349/138, 122
See application file for complete search history.

(56) References Cited

U.S. PATENT DOCUMENTS

| | | | | |
|---|---|---|---|---|
| 5,492,582 A * | 2/1996 | Ide et al. | ..................... | 156/106 |
| 5,546,204 A * | 8/1996 | Ellis | ........................... | 349/46 |
| 5,636,329 A | 6/1997 | Sukegawa et al. | ........... | 349/149 |
| 5,724,107 A * | 3/1998 | Nishikawa et al. | ............ | 349/38 |
| 5,742,074 A * | 4/1998 | Takizawa et al. | .............. | 257/59 |
| 5,771,083 A * | 6/1998 | Fujihara et al. | ............. | 349/147 |
| 5,825,449 A | 10/1998 | Shin | ........................... | 349/148 |
| 5,851,918 A * | 12/1998 | Song et al. | .................. | 438/627 |
| 6,013,923 A | 1/2000 | Huang | .......................... | 257/59 |
| 6,016,174 A * | 1/2000 | Endo et al. | ..................... | 349/43 |
| 6,172,733 B1 * | 1/2001 | Hong et al. | ................. | 349/152 |

(Continued)

FOREIGN PATENT DOCUMENTS

JP    64-19324    1/1989

(Continued)

OTHER PUBLICATIONS

English Translation-in-part of Japanese Unexamined Patent Publication JP 64-19324.

(Continued)

*Primary Examiner*—Brian M Healy
(74) *Attorney, Agent, or Firm*—Ware, Fressola, Van Der Sluys & Adolpson LLP

(57) ABSTRACT

In the display area of the TFT array substrate, a pixel electrode, a switching element connected to the pixel electrode, a gate line connected to the switching element and a source line connected to the switching element are formed. In the terminal forming area of the TFT substrate, a terminal electrode for connecting the gate line or source line to external signal source is formed. Around the terminal forming area, a first metallic line and a second metallic line are extended below the terminal electrode. The first metallic line and the second metallic line are connected to the terminal electrode via respective contact holes. The first metallic line and the second metallic line are in different layers interposing an insulating layer therebetween.

21 Claims, 8 Drawing Sheets

U.S. PATENT DOCUMENTS

| | | | |
|---|---|---|---|
| 6,587,160 B2 * | 7/2003 | Kim et al. | 349/40 |
| 2002/0130983 A1 * | 9/2002 | Konishi et al. | 349/43 |

FOREIGN PATENT DOCUMENTS

| | | | |
|---|---|---|---|
| JP | 8-6059 | 1/1996 | 349/149 X |
| JP | 11-509938 | 8/1999 | 349/149 X |
| JP | 11-288007 | 10/1999 | 349/149 X |
| JP | 11-326942 | 11/1999 | 349/149 X |
| JP | 2000-35592 | 2/2000 | |
| JP | 2001-142096 | 5/2001 | 349/149 X |

OTHER PUBLICATIONS

English Translation-in-part of Japanese Unexamined Patent Publication JP 2000-35592.

Japanese Office Action issued Jul. 20, 2010 regarding JP-12596 of the Patent family.

* cited by examiner

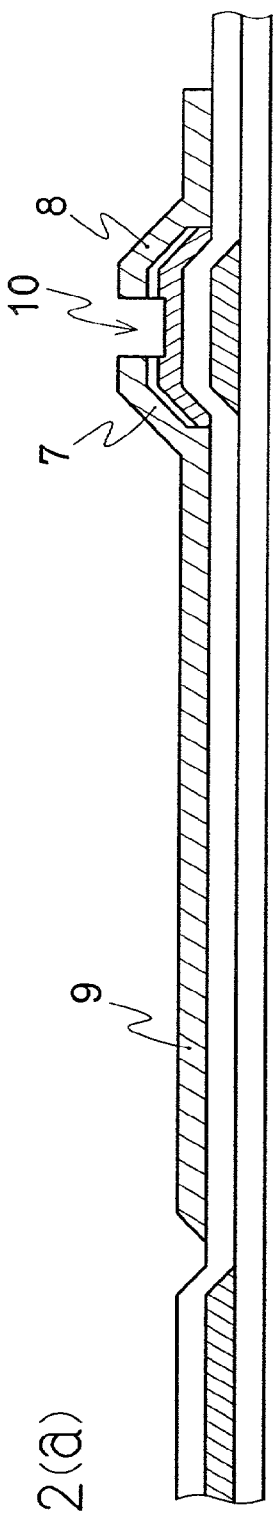
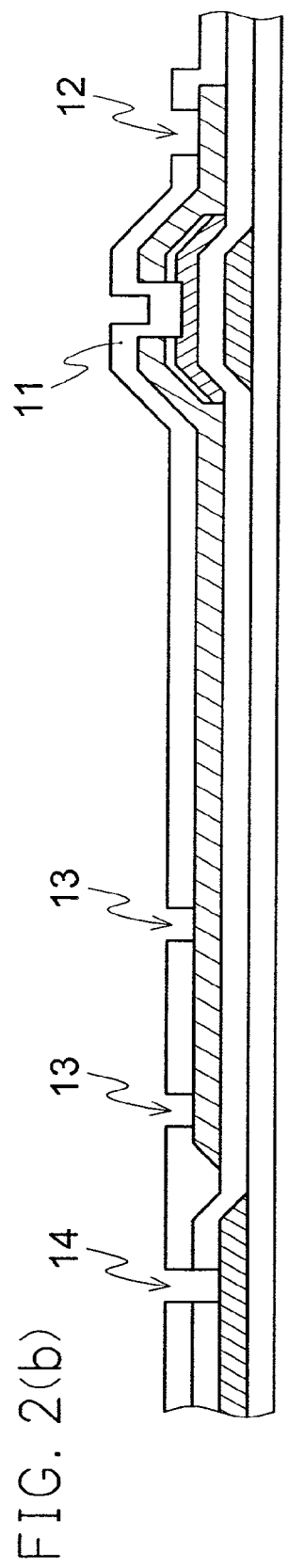
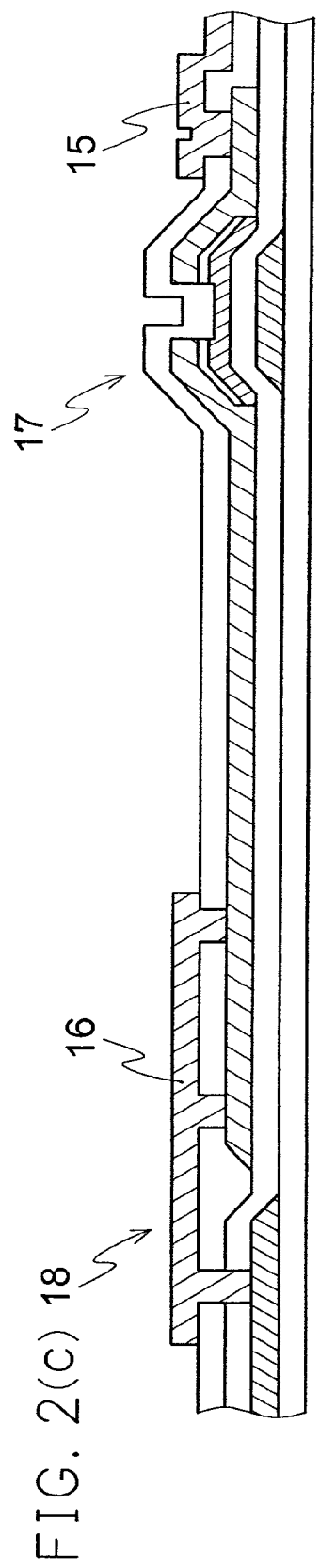

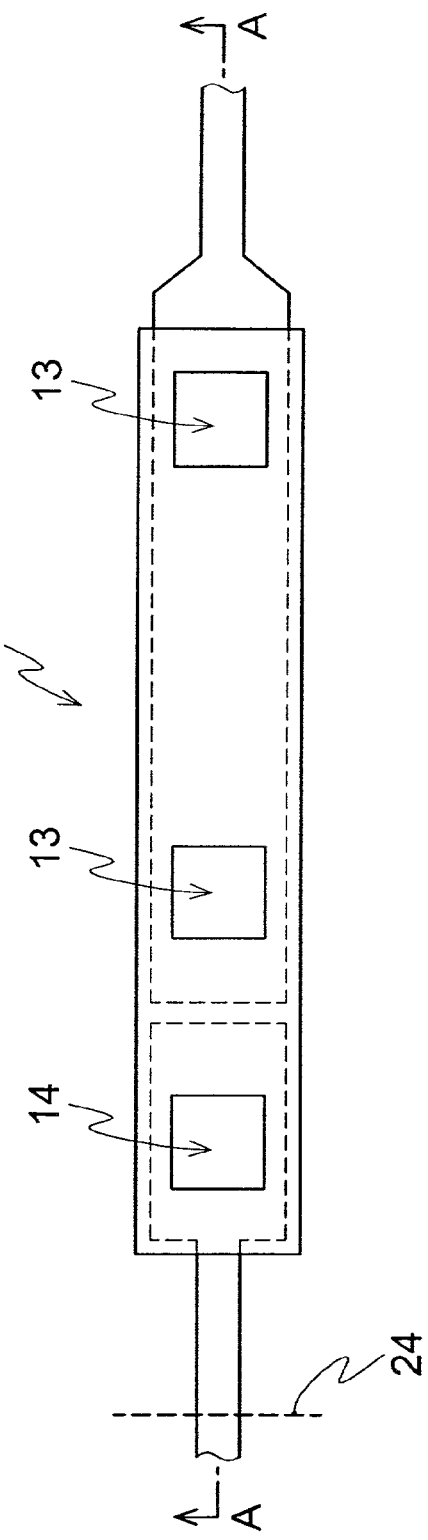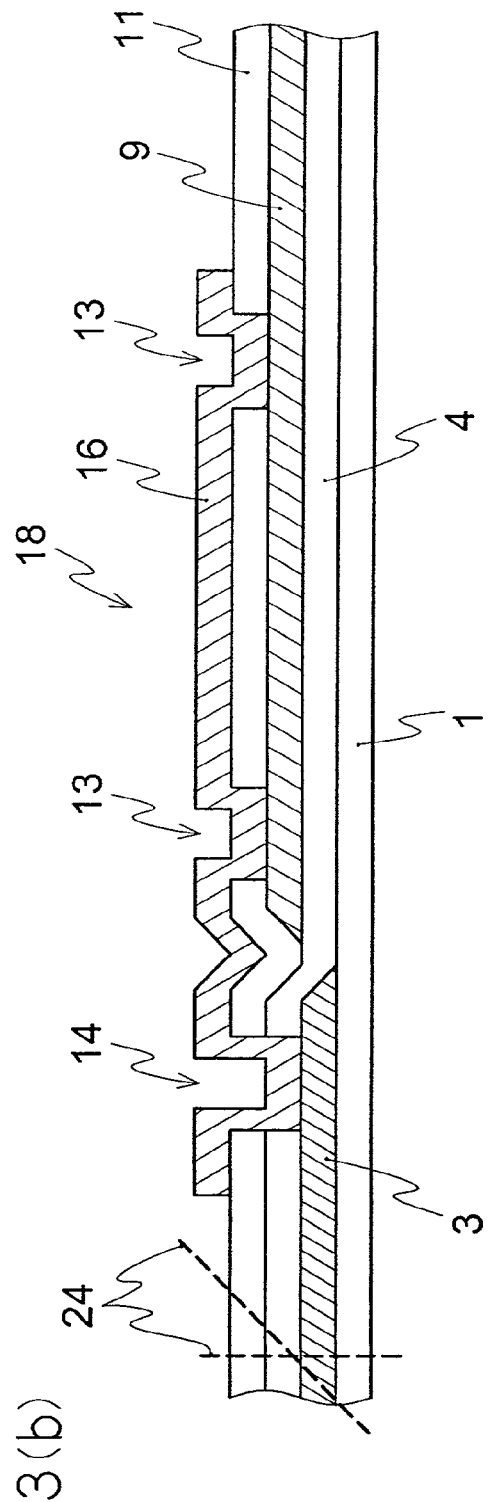
FIG. 3(a)
FIG. 3(b)

PRIOR ART

PRIOR ART

LIQUID CRYSTAL DISPLAY WITH STRUCTURE RESISTANT TO EXFOLIATION DURING FABRICATION

FIELD OF THE INVENTION

The present invention relates to a liquid crystal display, and more particularly, relates to an active-matrix liquid crystal display in which thin film transistors are employed as switching devices.

BACKGROUND OF THE INVENTION

In liquid crystal displays (hereinafter LCDs), liquid crystal material is sandwiched between a pair of substrates. FIG. 5 is an enlarged plain view of one of the substrates. On the substrate, pixel electrodes 15 are arranged in a matrix like manner of rows and columns as shown in FIG. 5. Furthermore, a switching device is provided for each pixel electrode to selectively apply voltage to the pixel electrode. Usually, a thin film transistor (hereinafter TFT) 17 is used as the switching device. Therefore, this substrate is called "a TFT array substrate". On the TFT array substrate, gate lines 2 and source lines 9 are provided to supply electric signals to respective TFTs 17. When the TFT turns "ON" by applying a signal to the gate line 2, voltage on the source line 9 is written into the pixel electrode 15. The other substrate, which is often called "a counter substrate", has a counter electrode formed thereon. Accordingly, liquid crystal interposed between the counter electrode and the pixel electrode is driven by potential difference between the electrodes, thereby obtaining any required display.

In FIG. 4, a plain view of the whole TFT array substrates is shown. The pixel electrodes 15 and the TFTs 17 are provided in a display area 22, and terminal forming regions 20, 21, in which terminals are formed, are provided around the display area 22. In the regions 20, 21, source terminals 18 and gate terminals 19 are formed respectively. The source terminal 18 is connected to the source line 9 in the display area 22. The gate terminal 19 is connected to the gate line 2 in the display area 22.

In order to protect the TFTs 17 from destruction by, for example, electrostatic discharge during fabrication process, the source terminals 18 and the gate terminal 19 are connected to a short-circuit ring 23. At the final stage of the fabrication process, the short-circuit ring 23 is removed by cutting off the edge of the TFT array substrate. Thereafter, wirings from external signal source are attached to the source terminals 18 and the gate terminals 19, therefore fabrication of LCD is completed.

Hereinafter, fabrication process of the TFT array substrate is described with referring to FIGS. 6, 7 and 8. FIGS. 6 and 7 are cross sectional view of the TFT array substrate showing a TFT and a source terminal formed thereon, and describing fabrication steps thereof. FIG. 8 is a magnified view of the source terminal 18 in FIG. 7(c). FIG. 8(a) is a plain view of the source terminal 18, and FIG. 8(b) is a cross sectional view taken along line B-B in FIG. 8(a).

In the figure, a transparent insulating substrate 1, such as a glass substrate, is shown. Of course, a simply insulating substrate is also applicable. On the substrate 1, a gate line 2 is formed. The gate line 2 is made from a metal film such as a film of Al or Cr. On the gate line 2 and covering the substrate 1, a gate insulating layer 4 is formed. The gate insulating layer 4 is made of silicon nitride.

Above the gate line 2 and interposing the gate insulating layer 4, a semiconductor layer 5 is formed. The semiconductor layer 5 is made from, for example, a film of amorphous silicon. On the semiconductor layer 5, a contact layer 6 is formed. The contact layer 6 is made from a film of n+ amorphous silicon. On the contact layer 6, a source electrode 7 and a drain electrode 8 are formed. With the source electrode 7 and the drain electrode 8, a source line 9 is formed at the same time. By etching the contact layer 6 partly, a channel 10 of the TFT is formed. Not to expose the TFT 17, a passivation film 11 is formed. The passivation film 11 is made of silicon nitride.

On the drain electrode 8 and through the passivation film 11, a contact hole 12 is formed for connecting the drain electrode 8 with a pixel electrode 15. On the source line 9 and through the passivation film 11, a contact hole 13 is formed for connecting the source line 9 with a terminal electrode 16. The pixel electrode 15 is made from a film of indium tin oxide (ITO). With the pixel electrode 15, the terminal electrode 16 is formed from the same ITO film at the same time.

Hereinafter, fabrication process of the TFT array substrate is described more in detail with referring to FIGS. 6, 7 and 8.

First of all, a metal film, such as a film of Cr or Al, is formed on an insulating substrate 1 by sputtering method. Then, the film is patterned using photo resist through photolithography to form a gate line 2 (FIG. 6(a)).

Thereafter, a silicon nitride film as a gate insulating layer 4 is deposited onto the substrate 1 with the gate line 2, by a plasma CVD method (FIG. 6(b)). Further, an amorphous silicon film is formed thereon, and successively, a n+ amorphous silicon film in which impurities are doped is formed. Then, the amorphous silicon film and the n+ amorphous silicon film are simultaneously patterned using photo resist through photolithography to form a semiconductor layer 5 and the contact layer 6 of TFT above the gate line 2 (FIG. 6(c)).

Afterwards, a metal film such as Cr film or Al film is formed by a method such as sputtering. Then, the film is patterned using photo resist through photolithography to form a source electrode 7, drain electrode 8 and source line 9. Thereafter, the n+ amorphous silicon (contact layer 6) is partly etched, that is, an area on which neither the source electrode 7 nor the drain electrode 8 is formed is etched through dry-etching process, so that the channel 10 is formed (FIG. 7(a)).

Then, to provide protection for TFTs, a silicon nitride film as a passivation film 11 is deposited by a method such as plasma CVD. Thereafter, through dry-etching process using photo resist by photolithography, contact holes 12 and 13 are formed (FIG. 7(b)). As described above, the contact hole 12 is for connecting the drain electrode 8 with a pixel electrode 15, and the contact hole 13 is for connecting the source line 9 with a terminal electrode 16.

Afterwards, a transparent conductive film such as an ITO film is formed by a method such as sputtering. Then, the film is patterned using photo resist through photolithography, so that the pixel electrode 15 and the terminal electrode 16 are formed simultaneously. As described above, the terminal electrode 16 is for connection to external signal source.

For the TFT array substrate thus fabricated, an enlarged view around the source terminal 18 is shown in FIG. 8. As described above, the terminal electrode 16 is positioned as the uppermost layer of the source terminal 18 for external connection. The terminal electrode 16 is also connected to the source line 9 via the contact hole 13 and an end of the source line 9 is connected to the source electrode 7 of the TFT 17, that is, internal connection. In the meantime, the other end of the source line 9 is connected to the short-circuit ring 23 (see FIG. 4).

At the final stage of the fabrication, the edge of the TFT array substrate is cut off and chamfered off along the line 24 to remove the short-circuit ring 23. However, especially when the edge of the substrate is chamfered, the source line 9 can be peeled off. The peeled metal pieces may contact each other to electrically connect the adjacent terminals, so that a problem of short-circuit between adjacent lines can be caused. Moreover, in case where the cutting line 24 is designed to be closer to the terminal electrode, or in case where the cutting line 24 is accidentally closed to the terminal electrode due to inaccuracy of manufacturing equipment, the peeled metal piece may contact with the terminal electrode of the adjacent terminal to cause a problem of short-circuit between adjacent lines.

As is already described above and as shown in FIG. 8, a single metallic layer is arranged below the terminal electrode 16 at the source terminal 18, in the conventional TFT array substrate. Namely, both the display area side (the right side in FIG. 8) and the short-circuit ring side (the left side in FIG. 8), the same metallic layer, that is, the source line 9 is arranged below the terminal electrode 16.

In this conventional structure, when the substrate is chamfered along the cutting line 24, the source line 9 at the edge is easily exfoliated to appear as a peeled metal piece. Therefore, since the peeled metal pieces easily contact each other to cause short-circuit between neighboring terminals, short-circuit between neighboring lines frequently occurs. Furthermore, the peeled metal piece easily contacts with the terminal electrode of the neighboring terminal and causes short-circuit between neighboring lines.

SUMMARY OF THE INVENTION

The object of the present invention is to solve the above problems, and to obtain liquid crystal display of high reliability by preventing exfoliation of the metallic film in cutting and chamfering process of the substrate.

In a liquid crystal display according to the present invention, liquid crystal is interposed between substrates. One of the substrates is provided with a display area and a terminal forming area. In the display area, a pixel electrode, a switching element connected to the pixel electrode, a gate line connected to the switching element and a source line connected to the switching element are formed. In the terminal forming area, a terminal electrode for connecting the gate line or source line to external signal source is formed. Moreover, around the terminal forming area, a first metallic line and a second metallic line are extended below the terminal electrode. The first metallic line and the second metallic line are connected to the terminal electrode via respective contact holes. The first metallic line and the second metallic line are in different layers interposing an insulating layer therebetween.

Moreover, either the first metallic line or the second metallic line is in the same layer as that for the gate line and the other metallic line is in the same layer as that for the source line.

Furthermore, either the first metallic line or the second metallic line is connected to the source line and the other metallic line is in a lower layer as that for the metallic line connected to the source line.

Elsewhere, either the first metallic line or the second metallic line is connected to the gate line and the other metallic line is in a lower layer as that for the metallic line connected to the gate line.

According to the present invention, since the metallic line around the cutting line is arranged in a lower layer than that in the conventional liquid crystal display, scraping of the metallic line is suppressed. Therefore, exfoliation of the metallic film is reduced, so that short circuit between adjacent terminals is prevented.

These and other objects, advantages and features of the present invention will become more apparent from the following description and the accompanying drawings.

BRIEF DESCRIPTION OF THE DRAWINGS

FIG. 2(*a*), 2(*b*) and 2(*c*) are cross sectional view showing the TFT array substrate for the liquid crystal display according to the present invention, and depicting fabrication steps of the TFT array substrate following the step of FIG. 1(*c*);

FIG. 3 (*a*) is an enlarged plain view of the source terminal on the TFT array substrate for the liquid crystal display according to the present invention, and FIG. 3(*b*) is a cross sectional view taken along line A-A in FIG. 3(*a*);

DETAILED DESCRIPTION

Figure 1A:
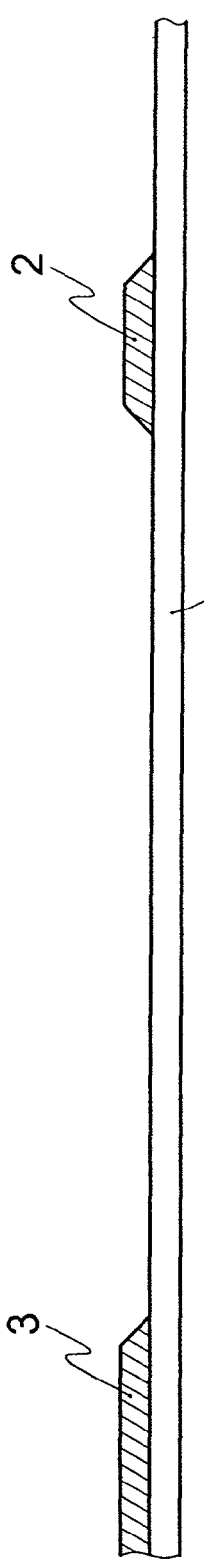
FIG. 1(*a*), 1(*b*) and 1(*c*) are cross sectional view showing the TFT array substrate for the liquid crystal display according to the present invention, and depicting fabrication steps of the TFT array substrate.

Hereinafter, embodiment of the present invention is described with referring to FIGS. 1, 2 and 3.

FIGS. 1 and 2 are cross sectional view of the TFT array substrate showing a TFT and a source terminal formed thereon, and describing fabrication steps thereof. FIG. 3 is a magnified view of the source terminal 18 in FIG. 2(*c*). FIG. 3(*a*) is a plain view of the source terminal 18, and FIG. 3(*b*) is a cross sectional view taken along line A-A in FIG. 3(*a*).

In the figure, a transparent insulating substrate 1, such as a glass substrate, is shown. Of course, a simply insulating substrate is also applicable. On the substrate 1, a gate line 2 and a supplementary line 3 are formed. The supplementary line 3 is for connecting the terminal to the short-circuit ring 23. The gate line 2 and the supplementary line 3 are made from a metal film such as a film of Al or Cr. On the gate line 2 and the supplementary line 3, a gate insulating layer 4 covering the substrate 1 is formed. The gate insulating layer 4 is made of silicon nitride.

Above the gate line 2 and interposing the gate insulating layer 4, a semiconductor layer 5 is formed. The semiconductor layer 5 is made from, for example, a film of amorphous silicon. On the semiconductor layer 5, a contact layer 6 is formed. The contact layer 6 is made from a film of n+ amorphous silicon. On the contact layer 6, a source electrode 7 and a drain electrode 8 are formed. With the source electrode 7 and the drain electrode 8, a source line 9 is formed at the same time. By partly etching the contact layer 6, a channel is formed. Not to expose the TFT 17, a passivation film 11 is formed. The passivation film 11 is made of silicon nitride.

On the drain electrode 8 and through the passivation film 11, a contact hole 12 is formed for connecting the drain electrode 8 with a pixel electrode 15. On the source line 9 and through the passivation film 11, a contact hole 13 is formed for connecting the source line 9 with a terminal electrode 16. On the supplementary line 3 through the gate insulating layer 4 and the passivation film 11, a contact hole 14 is formed for connecting the supplementary line 3 with the terminal electrode 16. The pixel electrode 15 is made from a film of indium tin oxide (ITO). With the pixel electrode 15, the terminal electrode 16 is formed from the same ITO film at the same time.

Hereinafter, fabrication process of the TFT array substrate is described more in detail with referring to FIGS. 1, 2 and 3.

First of all, a metal film, such as a film of Cr or Al, is formed on an insulating substrate 1 by sputtering method. Then, the film is patterned using photo resist through photolithography to form a gate line 2 and a supplementary line 3 (FIG. 1(a)). To pattern the metal film, e.g. the film of Cr or Al, wet-etching method is used. Therefore, through investigation on the composition of the etchant, side surfaces of the gate and supplementary lines are taperingly etched, so that coverage of a layer formed thereon can be improved.

Figure 1B:
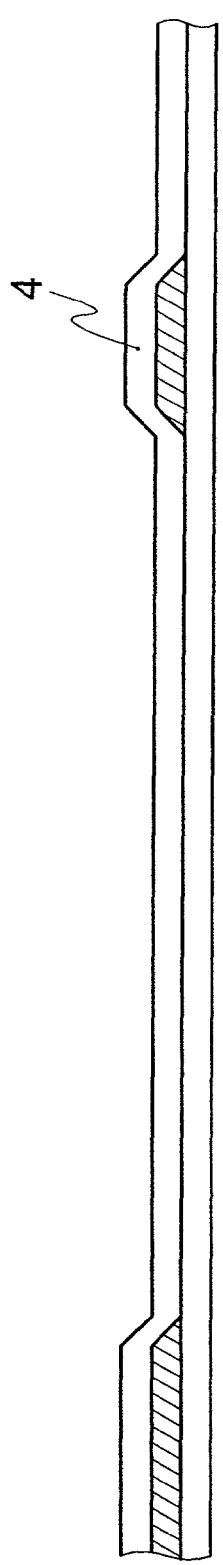
Figure 1C:
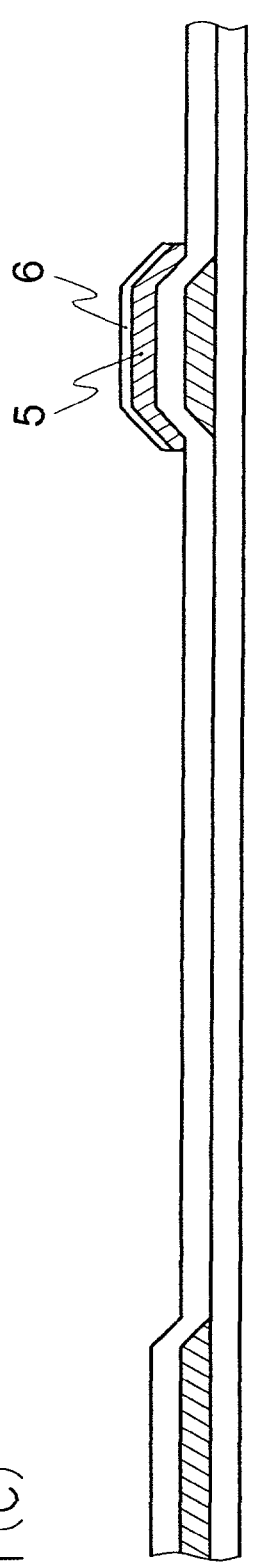
Figure 4:
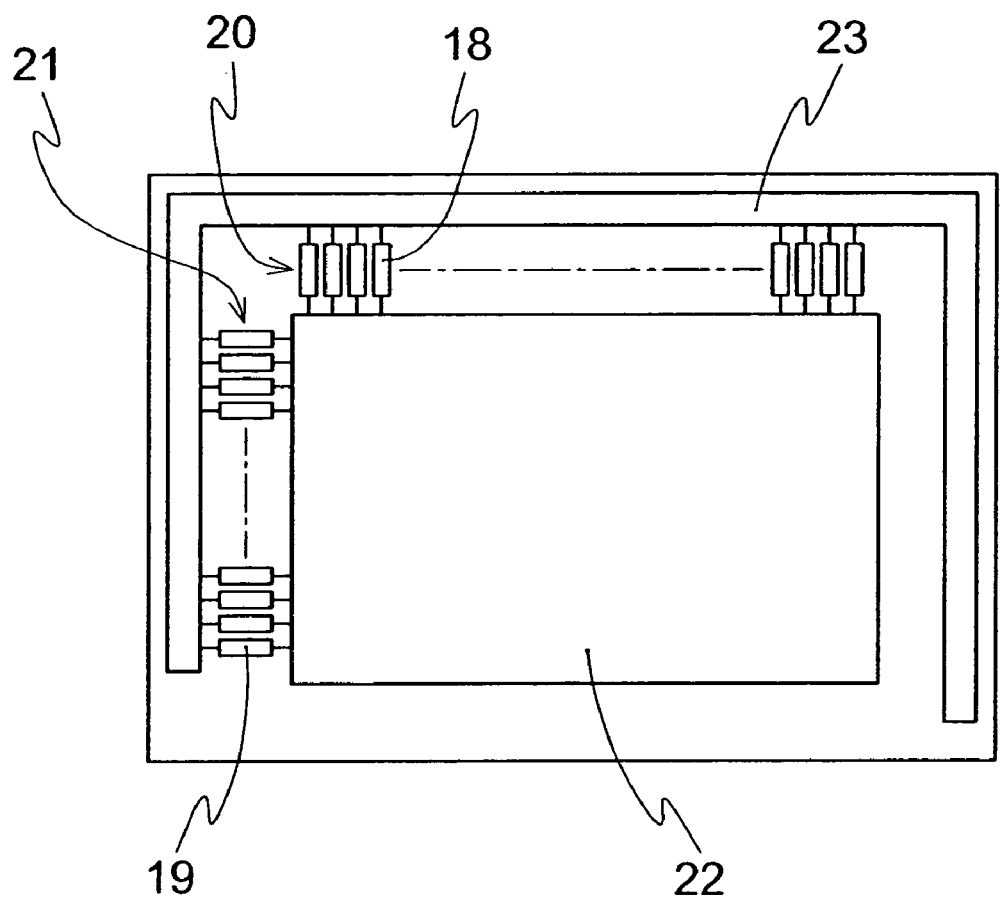
FIG. 4 is a schematic plan view showing a TFT array substrate for liquid crystal display.
Figure 5:
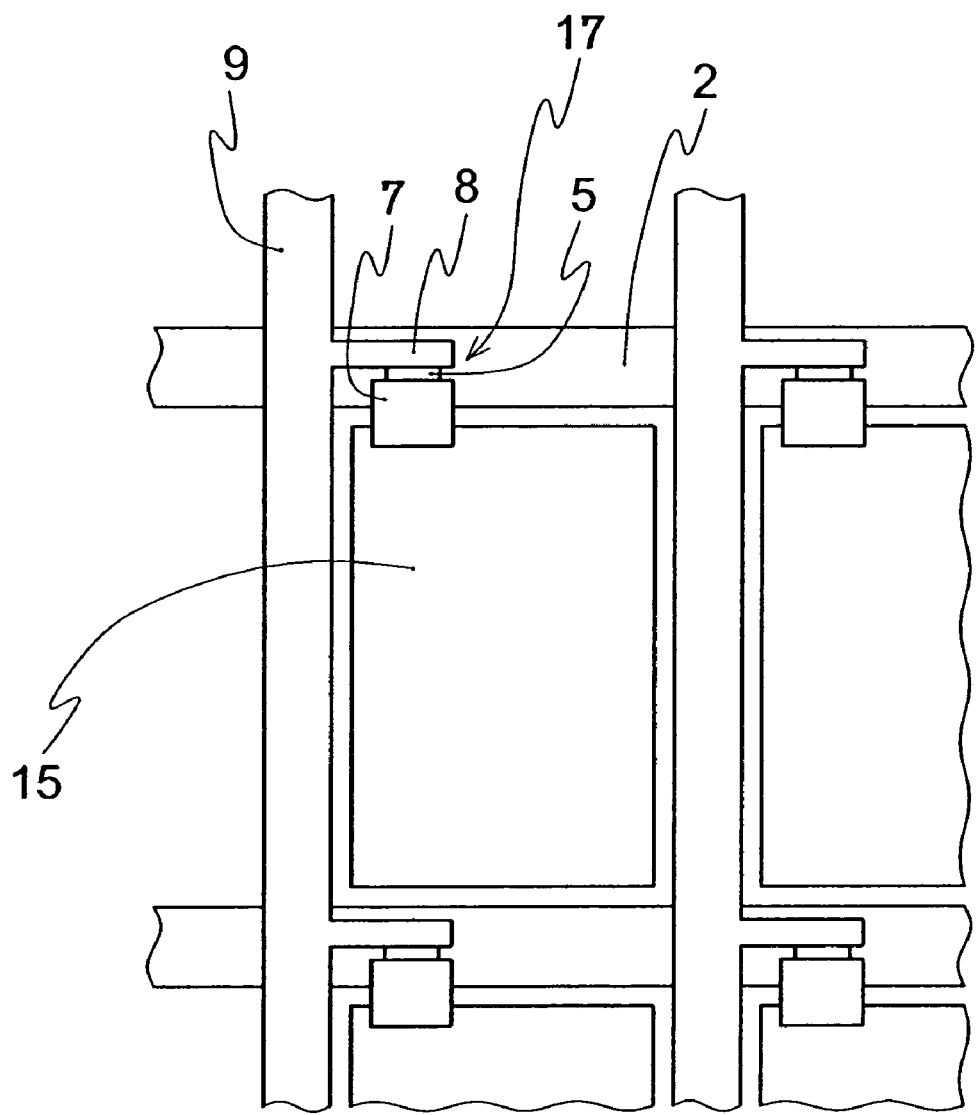
FIG. 5 is an enlarged plain view showing a TFT array substrate for liquid crystal display and depicting pixel electrodes, TFTs and source lines.
Figure 6A:
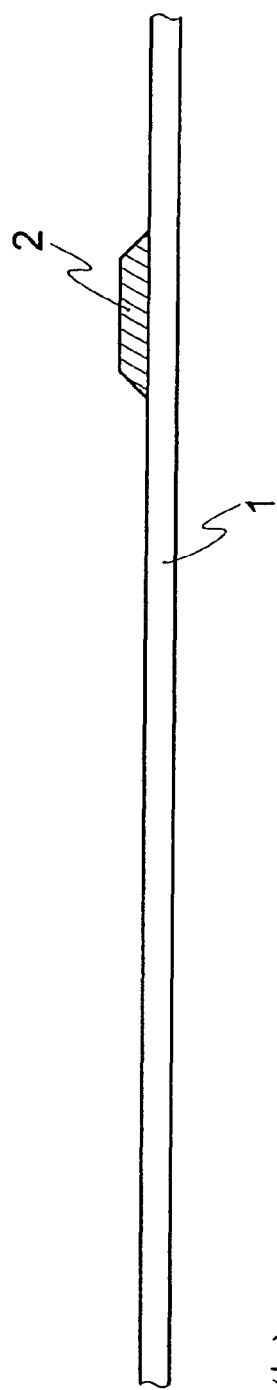
FIG. 6(*a*), 6(*b*) and 6(*c*) are cross sectional view showing a TFT array substrate for the conventional liquid crystal display, and depicting fabrication steps of the TFT array substrate.
Figure 6B:
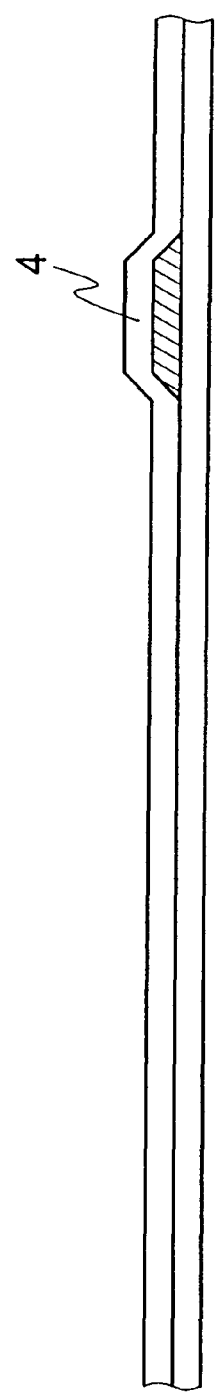
Figure 6C:
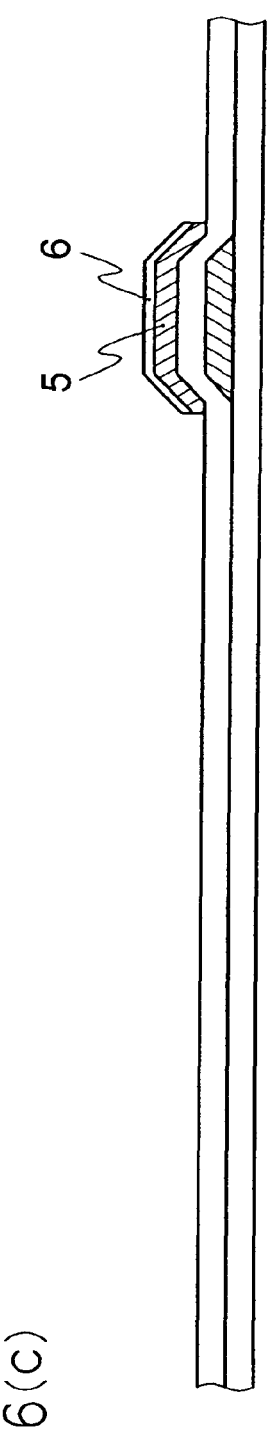

Thereafter, a silicon nitride film as a gate insulating layer 4 is deposited onto the substrate 1 with the gate line 2 and the supplementary line 3, by a plasma CVD method (FIG. 1(b)). Further, an amorphous silicon film is formed thereon, and successively, a n+ amorphous silicon film in which impurities are doped is formed. Then, the amorphous silicon film and the n+ amorphous silicon film are simultaneously patterned using photo resist through photolithography to form a semiconductor layer 5 and the contact layer 6 of TFT above the gate line 2 (FIG. 1(c)).

Afterwards, a metal film such as Cr film or Al film is formed by a method such as sputtering. Then, the film is patterned using photo resist through photolithography to form a source electrode 7, drain electrode 8 and source line 9. Thereafter, the n+ amorphous silicon (contact layer 6) is partly etched, that is, an area on which neither the source electrode 7 nor the drain electrode 8 is formed is etched through dry-etching process, so that the channel 10 is formed (FIG. 2(a)).

Figure 7A:
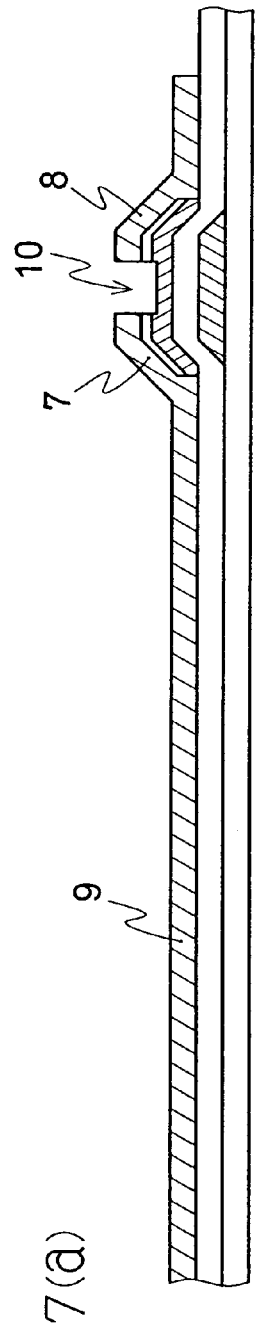
FIG. 7(*a*), 7(*b*) and 7(*c*) are cross sectional view showing the TFT array substrate for the conventional liquid crystal display, and depicting fabrication steps of the TFT array substrate following the step of FIG. 6(*c*)
Figure 7B:
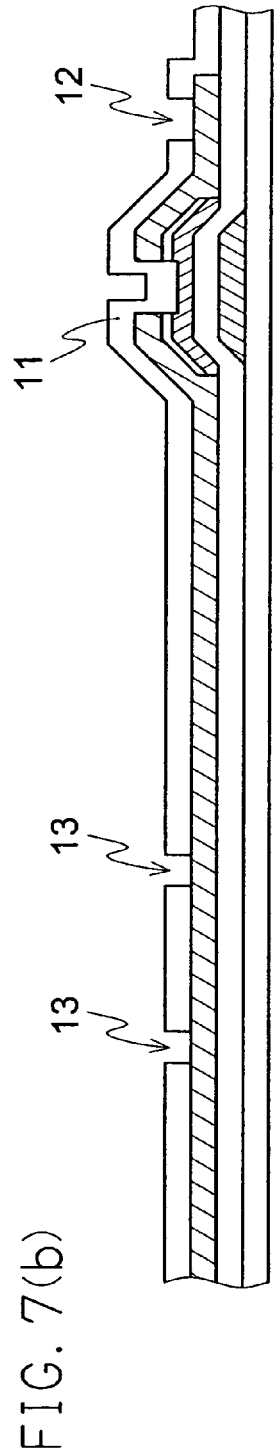
Figure 7C:
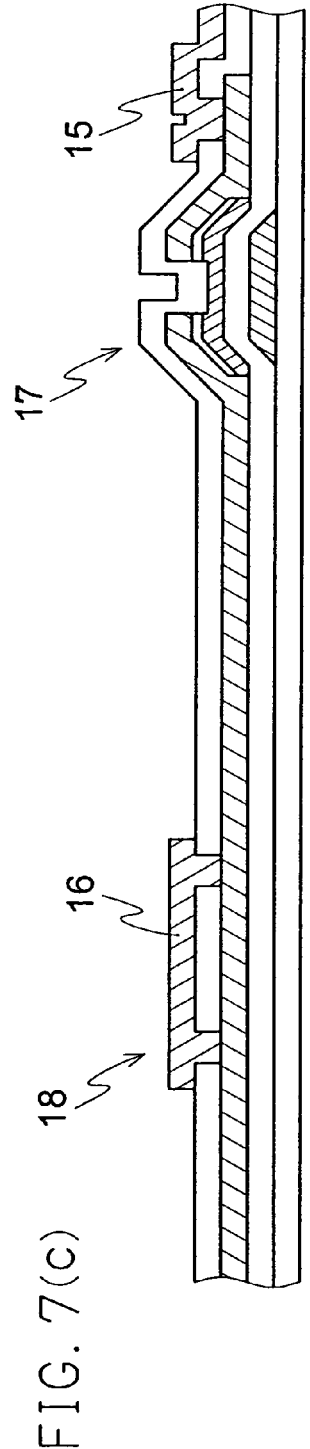
Figure 8A:
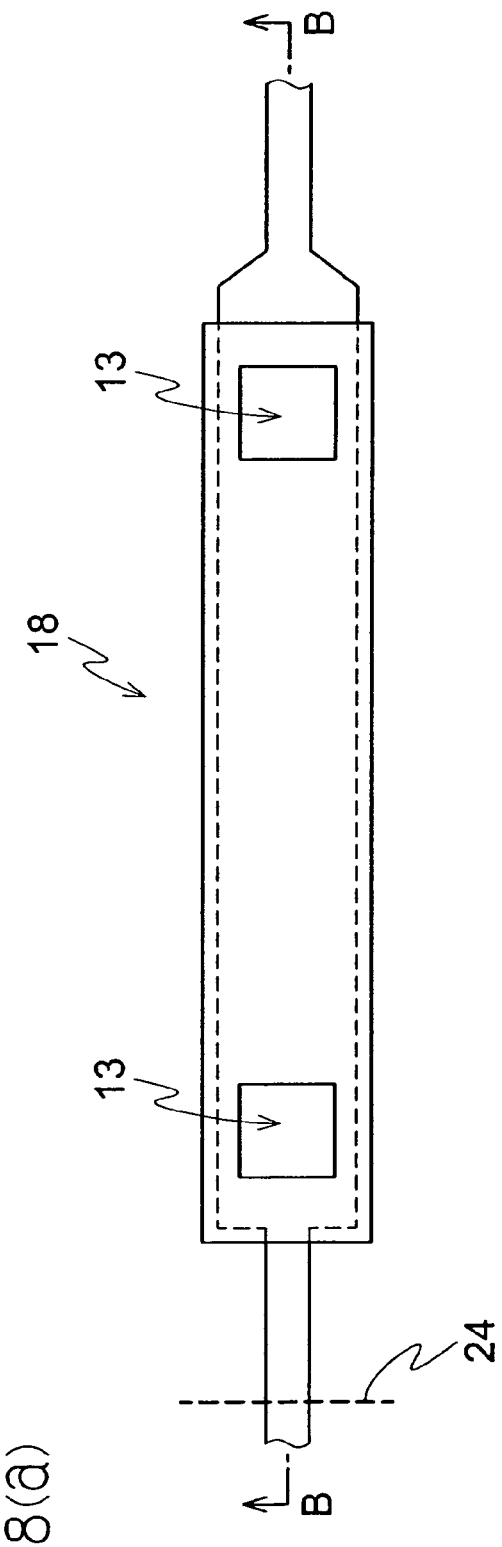
FIG. 8 (*a*) is an enlarged plain view of a source terminal on the TFT array substrate for the conventional liquid crystal display, and FIG. 8(*b*) is a cross sectional view taken along line B-B in FIG. 8(*a*).
Figure 8B:
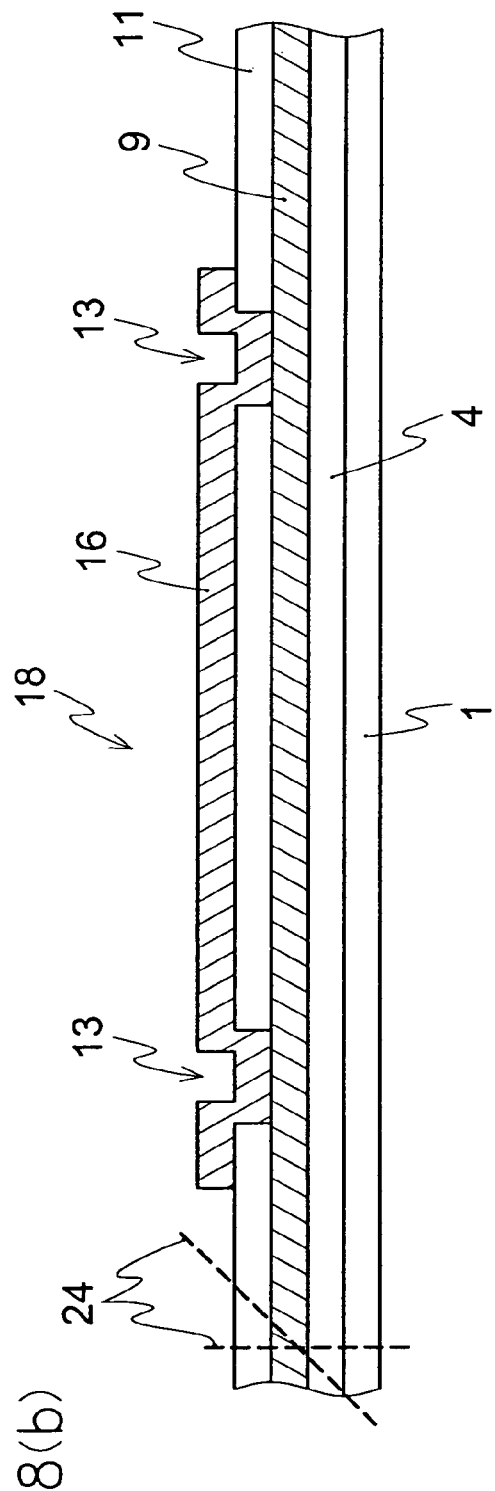

Then, to provide protection for TFTs, a silicon nitride film as a passivation film 11 is deposited by a method such as plasma CVD. Thereafter, through dry-etching process using photo resist by photolithography, contact holes 12, 13 and 14 are formed (FIG. 7(b)). As described above, the contact hole 12 is for connecting the drain electrode 8 with a pixel electrode 15, the contact hole 13 is for connecting the source line 9 with a terminal electrode 16, and the contact hole 14 is for connecting the supplementary line 3 with a terminal electrode 16.

Afterwards, a transparent conductive film such as an ITO film is formed by a method such as sputtering. Then, the film is patterned using photo resist through photolithography, so that the pixel electrode 15 and the terminal electrode 16 are formed simultaneously.

As described, therefore, the source line 9 is connected to the supplementary line 3 via the contact hole 13, terminal electrode 16 and contact hole 14, and the supplementary line 3 is connected to the short circuit ring 23.

For the TFT array substrate thus fabricated, an alignment film is further formed. Then, a counter substrate, in which a black matrix, a counter electrode and an alignment film are formed on a transparent insulating substrate, is arranged facing to the TFT substrate. Liquid crystal is injected between the substrates and sealed with sealant. Thereafter, the edge of the TFT array substrate is cut off to remove the short-circuit ring 23 and the cut edge is chamfered off, thus the liquid crystal display is fabricated.

As is already described above and as shown in enlarged view in FIG. 3, two metallic lines below the terminal electrode 16 are made from different metallic layers, in the TFT substrate according to the present embodiment. Namely, in the display area side (the right side in FIG. 3), a metallic line below the terminal electrode 16 is the source line 9 which is made from the metal film for the source electrode 7 and the drain electrode 8. While, in the edge side of the substrate, that is, the short-circuit ring side (the left side in FIG. 3), a metallic line below the terminal electrode 16 is the supplementary line 3 which is made from the metal film for the gate line 2.

In the TFT substrate according to the present invention, the metallic line around the cutting line 24 in FIG. 3, that is, the supplementary line 3 is arranged under the gate insulating layer. Therefore, the supplementary line 3 is not scraped or only slightly scraped through the chamfering process, so that occurrence of the peeled metal pieces is minimized. Moreover, by the gate insulating layer 4 covering the supplementary line 3, peeling of the supplementary line 3 as well as generation of peeled metal pieces can be decreased, so that occurrence of short circuit between terminals is prevented.

In the embodiment described above, the TFT array substrate, in which the source electrode and the source line are formed in an upper layer than the gate line and short-circuit between source terminals is problematic, is explained. However, of course in the TFT array substrate where the gate line is formed in an upper layer than the source line, peeling of gate line at the cut and chamfered edge can be suppressed and short circuit between the gate lines can be prevented according to the present invention.

As described above, according to the present invention in which a metallic line at the short-circuit ring side and a metallic line at the display area side are in different layers below the terminal electrode of the terminal, peeling of the metallic line by cutting and chamfering process of the substrate can be suppressed. Therefore, occurrence of peeled metal pieces can be reduced, so that short circuit between terminals is prevented to obtain a liquid crystal display of high reliability. Moreover, even in case where cutting and chamfering are performed proximately to the terminal electrode, short circuit between terminals is prevented. Therefore, requirement for high accuracy cutting and chamfering equipment, size of liquid crystal display and waste material due to cutting are reduced.

While preferred embodiment of the present invention has been described, such descriptions are for illustrative purposes only, and it is to be understood that changes and variations may be made without departing from the sprit or scope of the present invention.

What is claimed is:
1. A TFT array substrate, comprising:
a display area including a pixel electrode,
a switching element connected to the pixel electrode,
a gate line connected to the switching element and a source line connected to the switching element, and
a terminal formed outside of said display area for connecting the gate line or the source line to wiring from an external signal source, wherein the terminal comprises a terminal electrode connected to said wiring from said external signal source, and a first metallic line and a second metallic line arranged beneath the terminal electrode, and each are connected to the terminal electrode via a contact hole, wherein the first metallic line is formed in a side of the display area, and the second metallic line is formed in a side of the substrate end;

wherein the TFT array substrate further comprises an insulating layer which is interposed between the first metallic line and the second metallic line;

wherein the first metallic line is formed over the insulating layer;

wherein said second metallic line is formed beneath the insulating layer;

wherein any one of said first metallic line and said second metallic line is formed in the same layer of said source line, and the other one of said first and second metallic lines is formed in the same layer of said gate line;

wherein said first and second metallic lines are connected via a contact hole formed in a passivation film which is provided beneath the terminal electrode; and wherein said second metallic line, which is extending from the terminal electrode to the substrate end, is formed beneath both said insulating layer and said passivation film.

2. The TFT array substrate of claim 1, wherein the first metallic line and the terminal electrode are connected via a plurality of contact holes.

3. The TFT array substrate according to claim 1, wherein the side of the substrate end is a side where the TFT array substrate is cut off and chamfered off.

4. A TFT array substrate comprising:
a display area including a pixel electrode formed over a substrate;
a switching element connected to the pixel electrode;
a terminal electrode is formed outside of the display area for connecting to an external signal source;
a first conductive line extending from the terminal electrode to the display area;
a second conductive line connected to the terminal electrode and extending from the terminal electrode to the end of the substrate;
an insulating layer that is interposed between the first conductive line and the second conductive line, the insulating layer formed over the second conductive layer; and
wherein the second conductive line is connected to the terminal electrode via a contact hole formed in the insulating layer.

5. The TFT array substrate according to claim 4, wherein the first conductive line is formed over the insulating layer.

6. The TFT array substrate according to claim 4, wherein a passivation film is formed over the first conductive line and the first conductive line is connected to the terminal electrode via a contact hole formed in the passivation film.

7. The TFT array substrate according to claim 4, wherein the second conductive line is formed in a lower layer than the layer where the first conductive line is formed.

8. The TFT array substrate according to claim 4, wherein the first conductive line is connected to a gate electrode or a source electrode.

9. The TFT array substrate according to claim 4, wherein a passivation film is formed over the insulating layer so that the insulating layer is sandwiched between the passivation film and the second conductive layer.

10. The TFT array substrate according to claim 4, wherein the insulating layer is a gate insulating layer.

11. The TFT array substrate according to claim 4, wherein the second conductive line is directly connected to the terminal electrode.

12. The TFT array substrate according to claim 9, wherein the passivation film is further formed over the first conductive line.

13. The TFT array substrate according to claim 12, wherein the insulating layer includes a first part formed in the same layer as the layer where the first conductive line is formed, a second part formed beneath the first conductive line, and a part extending from the first part to the second part;

wherein the second conductive line is formed beneath the first part of the first insulating layer; and wherein the terminal electrode extending from over the first conductive line to over the second conductive line is connected to the first conductive layer via the contact hole formed in the passivation layer, and connected to the second conductive layer via a contact hole formed in the passivation layer and the insulating layer.

14. A TFT array substrate comprising;
a display area including a pixel electrode formed over a substrate;
a switching element connected to the pixel electrode;
a terminal electrode is formed outside of the display area for connecting to a signal source;
a first conductive line extending from the terminal electrode to the display area;
a second conductive line extending from the terminal electrode to the end of the substrate, the second conductive line formed in a lower layer than the layer where the first conductive line is formed; and
an insulating layer formed over the second conductive line, wherein the second conductive line is not directly connected to the first conductive line.

15. The TFT array substrate according to claim 14, wherein a passivation layer is disposed over the insulating layer.

16. The TFT array substrate according to claim 14, wherein the insulating layer is a gate insulating layer.

17. The TFT array substrate according to claim 4, wherein the first conductive line and the terminal electrode are connected via a plurality of contact holes.

18. The TFT array substrate according to claim 17, wherein the plurality of contact holes are provided near the end of the side of the display area of the terminal electrode and near the end of the substrate of the first conductive line.

19. The TFT array substrate according to claim 4, wherein the width of the second conductive line becomes thin near the end of the side of the substrate end of the terminal electrode.

20. A display device comprising the TFT array substrate of claim 4.

21. A display device comprising the TFT array substrate of claim 14.

* * * * *